Dec. 15, 1925.

M. AUERBACH

1,566,136

SHUTTLE CHANGING MECHANISM FOR LOOMS

Filed March 26, 1923    10 Sheets-Sheet 3

Inventor:
M. Auerbach
By Marker Clark
Attys.

Dec. 15, 1925.  1,566,136
M. AUERBACH
SHUTTLE CHANGING MECHANISM FOR LOOMS
Filed March 26, 1923   10 Sheets-Sheet 8

FIG. 11.

Inventor:
M. Auerbach

Dec. 15, 1925.  1,566,136
M. AUERBACH
SHUTTLE CHANGING MECHANISM FOR LOOMS
Filed March 26, 1923      10 Sheets-Sheet 9

Patented Dec. 15, 1925.

1,566,136

UNITED STATES PATENT OFFICE.

MAX AUERBACH, OF THE HAGUE, NETHERLANDS.

SHUTTLE-CHANGING MECHANISM FOR LOOMS.

Application filed March 26, 1923. Serial No. 627,839.

*To all whom it may concern:*

Be it known that I, Director MAX AUERBACH, citizen of formerly Russia (now without nationality), residing at The Hague, Netherlands, 138 Javastraat, have invented certain new and useful Improvements in Shuttle-Changing Mechanisms for Looms, of which the following is a specification.

This invention relates to shuttle-changing mechanisms for looms of the kind in which on the breakage or exhaustion of the weft, the shuttle stop motion or a cop feeler actuates mechanism which swings the rear wall of the shuttle-box inwards for ejecting the spent shuttle and raises the front wall of the shuttle-box to allow a full shuttle to be introduced after the spent shuttle has passed out of the shuttle-box.

The object of the present invention is to ensure the successive movements of the rear and front walls taking place in such a manner that these movements will not interfere with one another. The invention is applicable both in the case where the spent shuttle is conveyed directly to the spent shuttle receiver, as well as where the spent shuttle, after passing out of the shuttle-box, is checked and held against the rear wall until the latter swings back again into its normal position, when the spent shuttle will be in a position ready to fall into the receiver.

One feature of the invention consists in the provision of means for preventing the rear wall of the shuttle-box from swinging inwards until the front wall is fully raised and for maintaining the front wall in its raised position while the rear wall is in its inwardly swung position, whereby the operation of the front and rear walls is effected positively in proper sequence.

Another feature of the invention consists in providing controlling means operated by the spent shuttle, whereby the pusher for feeding a fresh shuttle into the shuttle-box is only engaged by the finger on the slay which actuates it, after the spent shuttle has passed completely out of the shuttle-box. By this means mutual interference of the shuttles with one another during the changing operation is prevented.

Other features of the invention will be described with reference to the accompanying drawings, in which—

In Fig. 1 the parts of the device are in the normal position, the slay being almost in its extreme forward position, Fig. 2 shows the slay in its extreme forward position and the member, which operates the changing mechanism, released by the weft feeler.

Fig. 3 shows the slay in its rearward position with the front wall of the shuttle-box raised and the rear wall swung inwards, both walls being locked in the position shown.

Fig. 4 shows the slay after it has moved back again almost into its extreme forward position after the empty shuttle has passed out of the shuttle-box with the rear wall of the shuttle-box almost in its outwardly swung position, but with the front wall still open.

Figure 6:
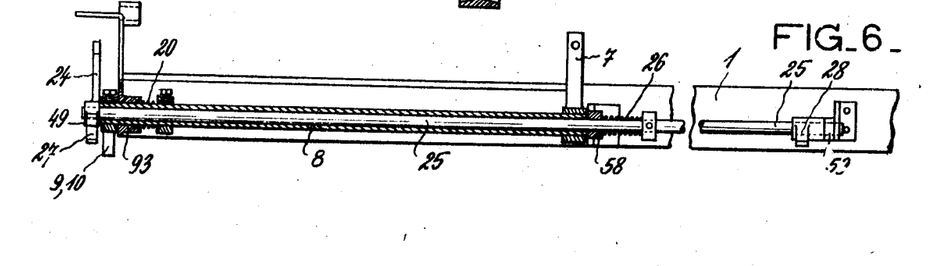
Fig. 6 shows an elevation, partly in section, of a portion of the shuttle changing mechanism.
Figure 7:
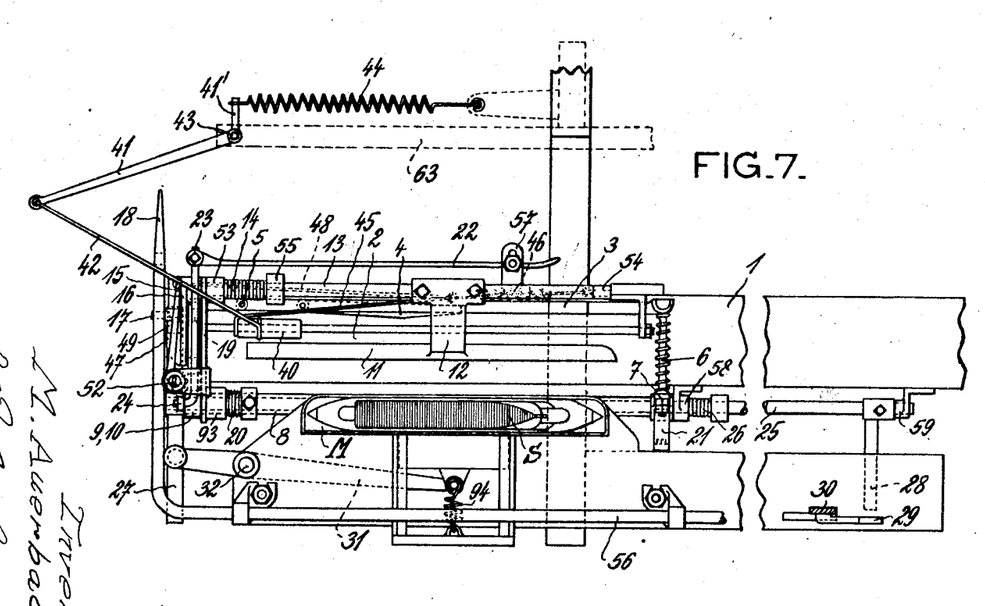
Fig. 7 is a plan view of Fig. 1.
Figure 8:
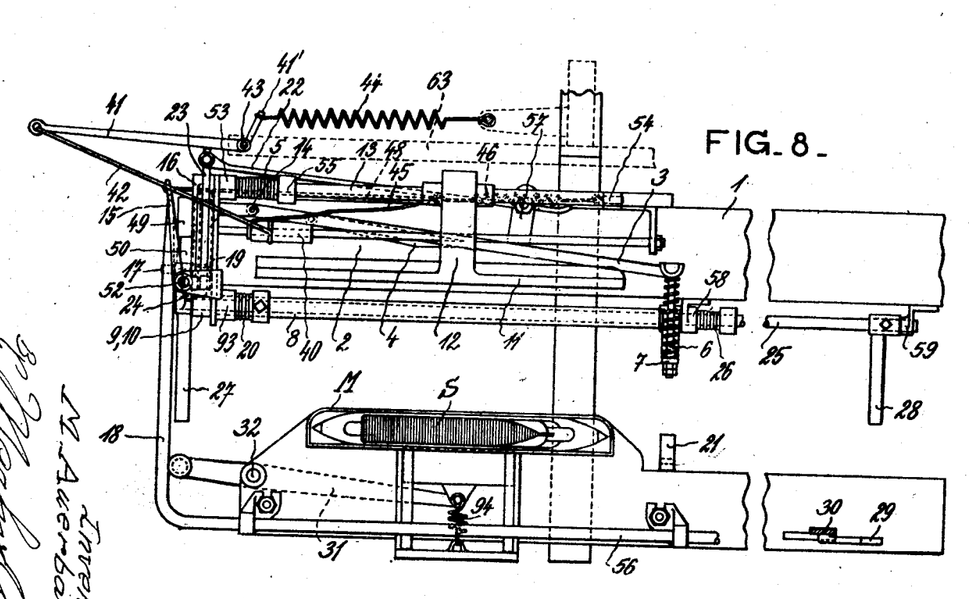
Fig. 8 is a plan view of Fig. 3.
Figure 9:
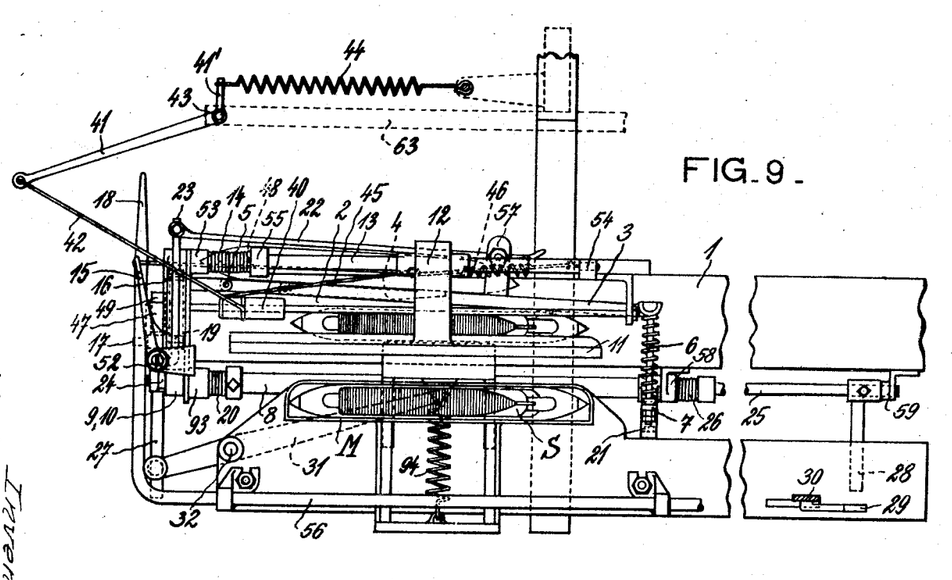
Fig. 9 is a plan view of Fig. 4, the new shuttle being already in the shuttle-box and the spent shuttle still held against the rear wall of the shuttle-box by a resilient swell.

Referring to the drawings, 1 is the slay and 2 the shuttle-box, which is provided with a rear wall 3 and a front wall 11. The rear wall 3 of the shuttle-box is pivoted at one end on a vertical pivot pin 5 so as to be capable of swinging inwards into the shuttle-box and is provided with a tongue 4 along the back of which the spent shuttle is guided out of the shuttle-box when the rear wall is swung inwards (Fig. 8). The rear wall 3 is connected by a connecting rod 6 to a lever arm 7 fixed on a hollow shaft 8 which is journalled at one end in a bearing 93 provided on the slay. Within the hollow shaft 8 is housed a shaft 25, which extends for some distance beyond the shaft 8 at the end thereof remote from the bearing 93 and is journalled in bearings 58 and 59 on the front of the slay (Fig. 6). A lever arm 9 formed with two curved locking members 95 and 10 is also fixed on the shaft 8. The front wall 11 of the shuttle-box is carried by a lever 12 rigidly mounted on a shaft 13 journaled in bearings 53 and 54 on the slay. A helical torsion spring 14 attached at one end to the bearing 53 and at the other end to a collar 55 on the shaft 13 tends to keep the front wall in its closed position. A downwardly extending driving lever 16 is fixed to the lever 12 and carries at its free end a pin 17 which is adapted to engage with a hooked member 18 provided on a rock shaft 56, as shown in Figs. 7 and 9, formed by cranking one end of the shaft 56, which is journalled in adjustable bearings 64 on the loom frame.

Figure 2:
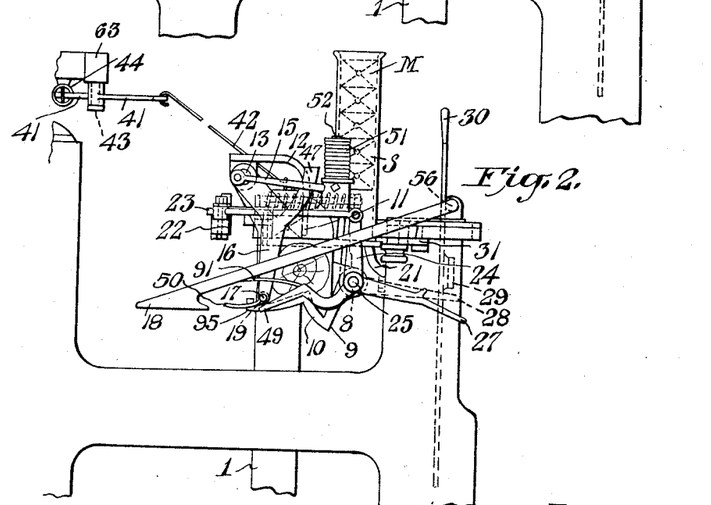
Figure 3:
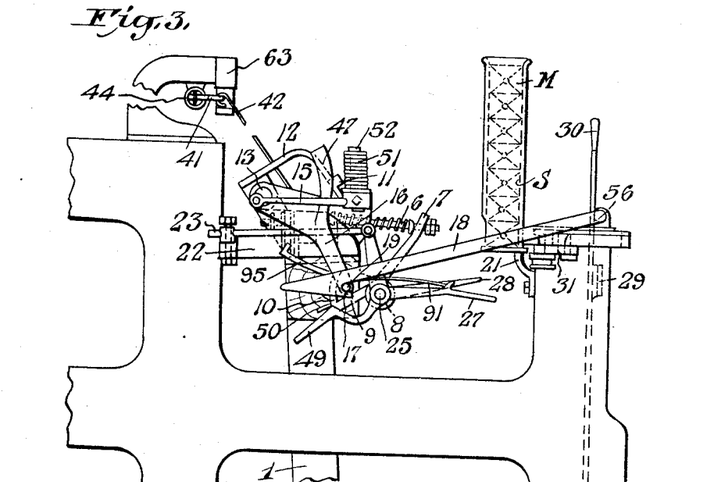
Figure 4:
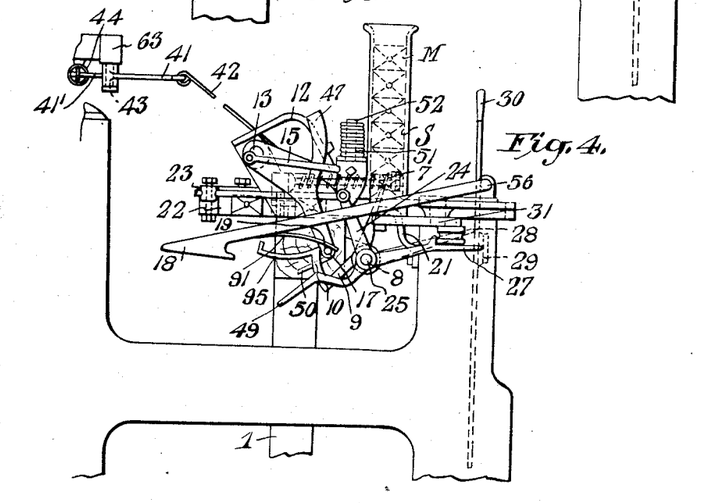
Figure 5:
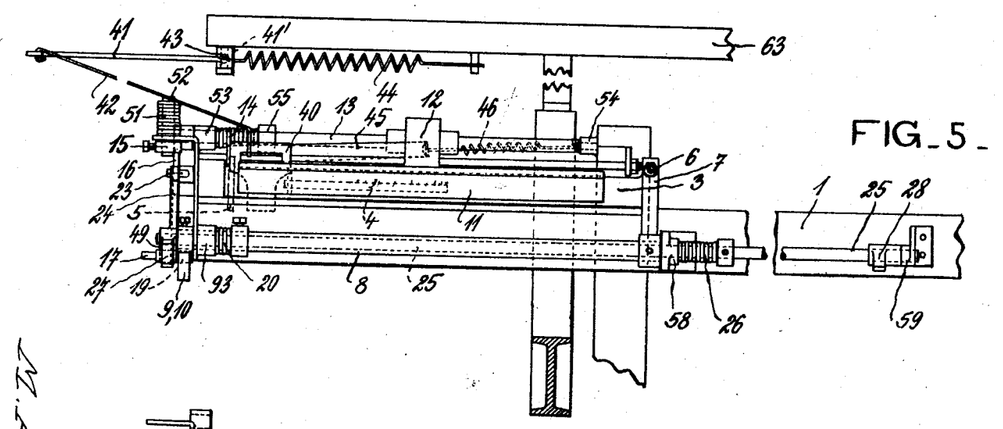
Fig. 5 is a front view of the lathe, the parts being in the position shown in Fig. 1.

The hooked member 18 is swung down into the path of the pin 17 (Figs. 2 and 3) by means of a cop feeler in the manner hereinafter described. The pin 17 has a portion 19 of larger diameter which extends on the other side of the lever 16 and constitutes a locking pin. When the front wall 11 is in its closed position (Figs. 1 and 2) the locking pin 19 rests on the curved locking member 95, the centre of curvature of which is substantially coaxial with the axis about which the driving lever 16 turns, namely the axis of the shaft 13. When the hooked member 18 is in the position shown in Fig. 2, it will engage and arrest the pin 17 on the driving lever 16 during the rearward movement of the slay, whereby during the remainder of the rearward movement the lever 16 will be rotated and will in turn rotate the shaft 13 against the action of the spring 14 and raise the front wall 11. As soon as the front wall reaches its completely raised position (Fig. 3), the locking pin 19 can engage behind the curved locking member 10, the centre of curvature of which is coaxial with the hollow shaft 8. A helical torsion spring 20 (Figs. 5 to 9) tends to turn the shaft 8 clockwise so that when the front wall is completely raised, the lever arm 9 will be swung upwardly into the position shown in Fig. 4 and the locking member 95 will lie in the path of the pin 19, thereby retaining the front wall in its completely open position. At the same time the lever arm 7 will pull the rod 6 to the right, thereby swinging the rear wall 3 inwardly into the shuttle-box.

Thus the rear wall of the shuttle-box is prevented from swinging inwards until the front wall has been completely raised into its open position by the rearward movement of the slay, immediately before the change of shuttles takes place, and after the rear wall has been swung into the shuttle-box, the front wall is locked in its open position until the rear wall has again been moved back out of the shuttle-box.

The rear wall is swung out of the shuttle-box into its closed position at the end of the beat, after the fresh shuttle has been inserted in the shuttle-box, by means of a stationary stop 21 on the loom frame against which the arm 7 strikes. During the closing movement of the rear wall, the lever arm 9 is swung down and releases the pin 19, from the locking member 95 when the rear wall is in its closed position, thereby allowing the front wall 11 to return to its normal closed position under the action of the spring 14.

The lever 18, which is normally held by a latch raised above the path of the pin 17, is released by the weft feeler 92 when the weft fails or becomes exhausted, and is raised again and re-engaged by the latch, after the change of shuttles has taken place. Rigid with the rock shaft 56 is a depending arm 65 (Figs. 10 to 13), which is pivoted at its lower end to a latching member 66 pivoted at 71 on the frame of the loom. When the hook 18 is in its raised position (Fig. 10) the latch 66 engages behind a stop 67 on an adjustable part 68, which can be fixed by means of a clamping screw 69 in different positions on the frame of the loom. A threaded bolt 73 is mounted on the stop 67 of the adjustable part 68, the said bolt passing through a projection 70 provided on the latch 66 close to its pivot 71. Surrounding the bolt 73 is a helical compression spring 72 which bears at one end against the stop 67 and at its other end against the projection 70. The spring 72 tends to turn the lever 65 in the direction corresponding to the downward swing of the hook 18, assists the hook to drop and ensures its engagement with the pin 17 on the driving lever 16, when the latch 66 is raised from the stop 67.

Figure 10:
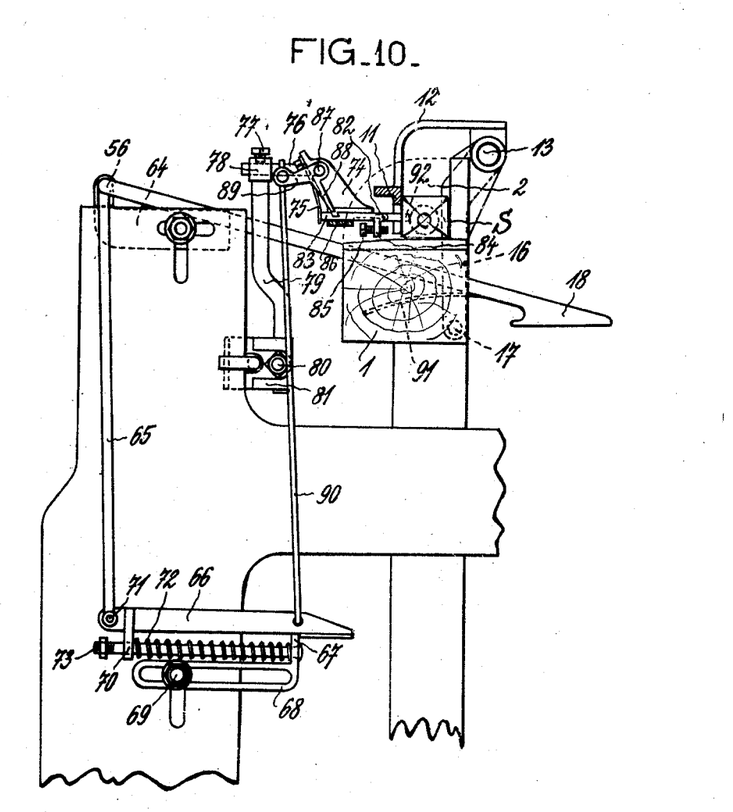
Figs. 10 to 13 show to an enlarged scale the other side of the loom with the weft feeler mechanism for releasing the member which operates the changing mechanism, the various positions of which are shown in side elevation. For the purpose of making the mode of operation of the release mechanism more readily understood, only those parts are shown, which co-act with it.
Figure 11:
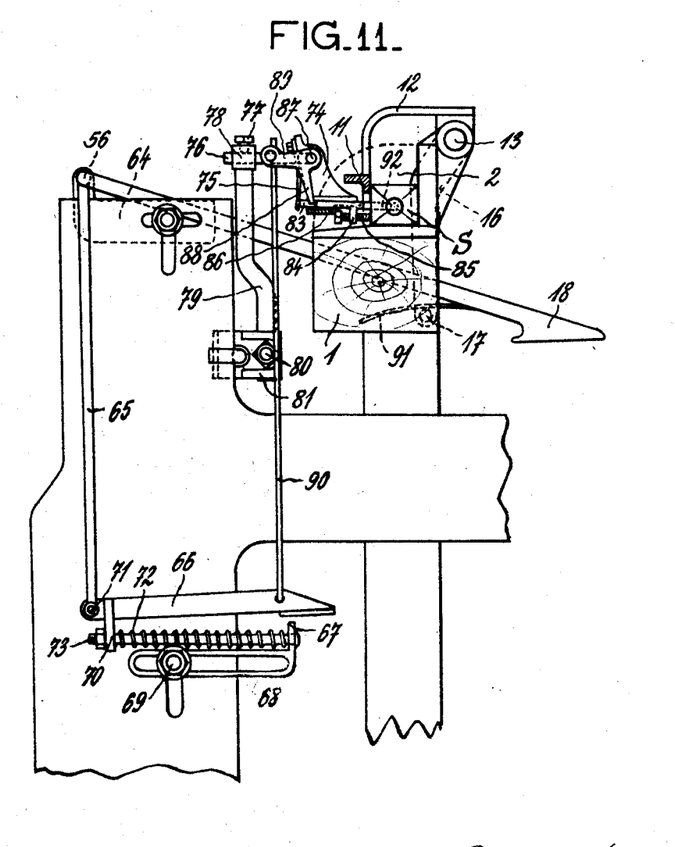
Figure 12:
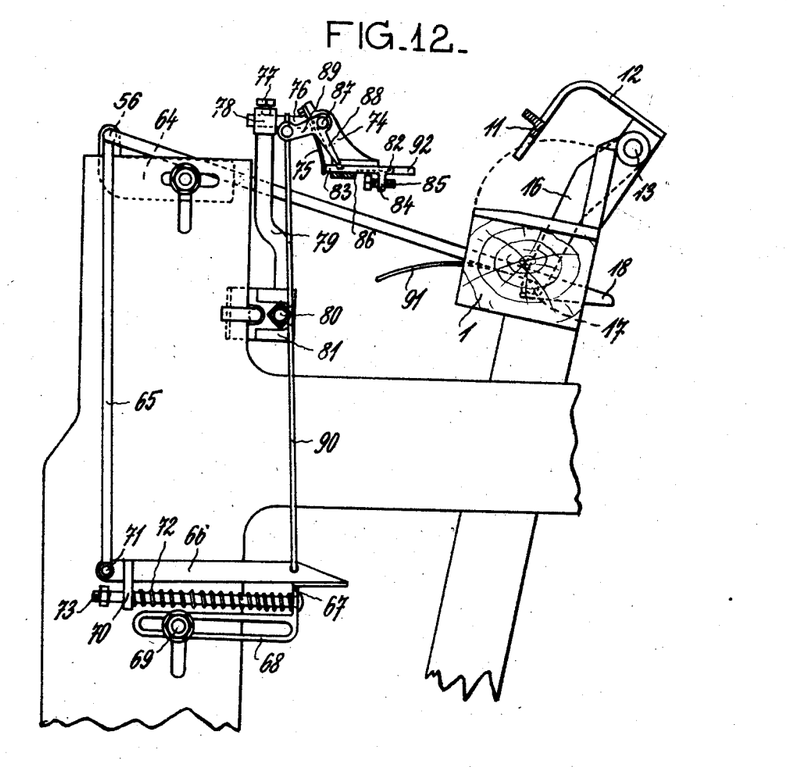

The weft feeler 92, which is slidably mounted in a bracket 74, projects through an opening in the shuttle when the slay moves forward, in the well-known manner, and is thereby pushed back against the action of a spring 75 by the weft in the shuttle (Fig. 10). The bracket 74 is provided with a rearwardly extending rod 76 by means of which it is supported on the loom. The rod 76 is slidably mounted in the eye 78 of an upright 79 and is fixed in its adjusted position by means of a set screw 77. The upright 79 is carried by a bracket 81 mounted on the loom frame, being fixed at an adjustable height thereon by means of a set screw 80. The feeler 92 is provided with a lateral pin 82 on which is pivoted a finger constructed as a cranked lever 83, 84. On the shorter downwardly directed arm 84 of the finger there is a set screw 85, which acts as a stop and is arranged to come into contact with the side of the shuttle S when the feeler 92 penetrates sufficiently far into the shuttle. The long arm 83 of the finger normally rests on the bottom 86 of the bracket 81 but when the weft in the shuttle is exhausted, the screw 85 is struck by the shuttle and rocks the finger 83, 84 so as to raise the long arm 83 from the bottom of the bracket 81. A cranked lever 88, 89 is pivoted on a pin 87 on the side of the bracket 81, the arm 89 of said lever being connected by a connecting rod 90 to the latching member 66, while the arm 88 extends directly above the long arm 83 of the lever 83, 84.

On the underside of the hook 18 is a curved part 91 along which the pin 17 of the driving lever 16 slides during the forward movement of the slay, when the hook 18 is in its lowered position, thereby raising the hook.

During the forward movements of the slay, when the shuttle contains a full pirn, the feeler 92 will be forced back in the usual manner (Fig. 10), as it can only penetrate a short distance into the shuttle and the set screw 85 will not be struck by the shuttle. If on the other hand the pirn is spent (Fig. 11), the feeler 92 will penetrate so far into the shuttle during the forward movement of the slay 1 that the set screw 85 will be struck by the shuttle, thus causing the finger 83, 84 to be rocked upwardly until its long arm 83 engages with the arm 88 of the cranked lever 88, 89. By this means, as the slay continues to swing forward, the arm 88 will be constrained to follow the rearward movement of the feeler 92 and will be rocked in the direction, which causes the release of the latching member 66 from the stop 67. Owing to the release of the latching member 66, the arm 65 and the hook 18 is acted on by the spring 72 and the hook 18 is lowered ready to engage with the pin 17 on the driving lever 16 during the following rearward movement of the slay 1.

Figure 13:
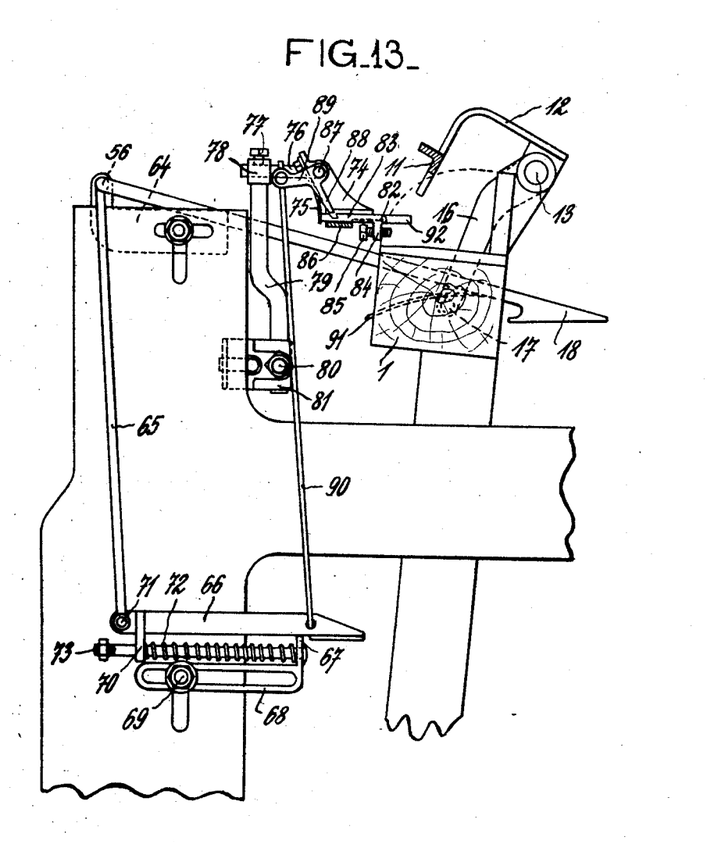

The front wall 11 of the shuttle box is raised, the rear wall 3 swung inwards and both walls are locked in these positions (Fig. 3) during this rearward movement of the slay. On the slay 1 swinging forward again, the pin 17 leaves the hook 18 and by acting on the curve 91 raises the hook, whereby the arm 65 re-engages the latch 66 with the stop 67, the latch having been lowered again in the meantime owing to the feeler 92 being moved back by the spring 75 and thereby releasing the cranked lever 88, 89 from the finger 83, 84 (Fig. 13).

In the constructional form of the invention shown in the drawings, the spent shuttle as it leaves the shuttle-box does not pass immediately into the spent shuttle receiver but is checked and held against the rear wall of the shuttle-box. For checking and catching the spent shuttle as it passes out of the shuttle-box along the back of the inwardly swung rear wall 3, a resilient checking and catching tongue or swell 22 is provided. This swell is pivoted near its inner end to a lug 57 on the rear wall of the shuttle-box, and extends at its outer end beyond the pivot pin 5 of the rear wall. The outer end of the swell is connected by means of a connecting rod 23 to a lever 24 fixed on the shaft 25 which also carries a lever 49. The shaft 25 is controlled by a torsion spring 26, which seeks to turn it in the direction of the arrow shown in Fig. 1. By this means the outer end of the tongue 22 is urged resiliently towards the rear wall of the shuttle-box, the distance between the tongue 22 and the rear wall 3 of the shuttle-box being determined by the lever 49 which coacts with a cam 50 at the end of the lever 16. When the rear wall of the shuttle-box swings forward, the right angled parallelogram formed by the rear wall 3 and the tongue 22 is converted into a figure, the corners of which are not right angles, so that the space between the tongue 22 and the rear wall 3 of the shuttle-box tapers to the outside and becomes narrower than the shuttle. By this means the shuttle on passing between the rear wall and the tongue 22 forces the outer end of the tongue away from the wall. On the shaft 25 there are further mounted a pusher finger 27 and, in the case of loose reed looms, a dagger 28, which is capable of coacting with a stop 29 on the stopping lever 30. The pusher finger 27 acts in a known manner on the pusher 31, which delivers the full shuttles from the magazine M and which is pivoted on a pivot pin 32 fixed on the loom frame. The pusher 31 is capable of being rocked against the action of a spring 94 to force the lowermost shuttle S out of the magazine M into the shuttle-box 2, which is brought up against it during the beating up motion of the slay, when the front wall 11 of the shuttle-box is raised (Fig. 9).

Figure 1:
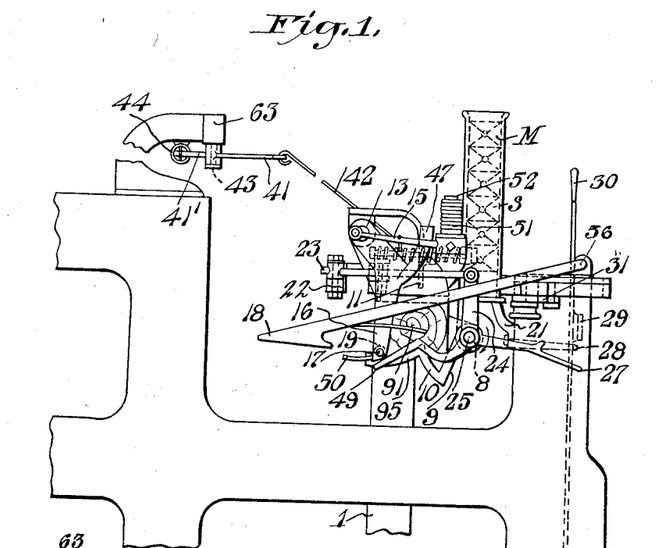
Figs. 1 to 4 are side elevations of the device in various positions for illustrating its mode of operation.

When, during the shuttle-changing operation, the spent shuttle comes between the rear wall 3 and the swell 22 (Fig. 4), it forces the outer end of the swell away from the rear wall, thereby rotating the shaft 25 in the anticlockwise direction, that is in the opposite direction to that indicated by the arrow in Fig. 1. This rotation of the shaft 25 raises the finger 27 into line with the pusher 31, while the dagger 28 is raised above the stop 29 on the stopping lever 30. The loom will thus continue to operate and as the slay moves forward the finger 27 will engage the pusher 31 which forces the lowermost shuttle out of the magazine into the shuttle-box. If the spent shuttle does not leave the shuttle-box completely and consequently does not move the outer end of the swell 22 sufficiently far from the rear wall 3, the finger 27 will be unable to engage the pusher 31 and the loom will be stopped by the dagger 28 striking the stop 29 on the stopping lever 30. Hence it is impossible for a new shuttle to be introduced into the shuttle-box if the spent shuttle should leave in an irregular manner, the loom being stopped instead.

The pusher finger 27 after engagement with the pusher 31 is turned a further short distance in the anticlockwise direction since the height of the shaft 25 becomes slightly reduced during the continued forward movement of the slay so that the finger 27 is rocked about its engaging end. This additional movement of the finger 27 causes the outer end of the swell 22 to be forced further away from the rear wall 3 of the shuttle-box, thereby releasing the shuttle which is free to fall as soon as the rear wall 3 has been forced out of the shuttle-box at the end of the beat by the end of the connecting rod 6 striking against the stop 21 on the loom frame. During the closing movement of the rear wall 3, the lever 7 is rocked and the shaft 8 is turned back to its normal position thereby lowering the locking members 9, 10 until the pin 19 on the driving lever 16 is disengaged from the locking member 10. This allows the front wall 11 to be swung down by the action of the spring 14.

When no shuttle is delivered into the shuttle box owing to the magazine M being empty, the shuttle stop motion will stop the loom. The swinging back of the rear wall 3 of the shuttle-box at the same time causes the space between it and the inner end of the swell 22 to be sufficiently widened, as the parallelogram which the rear wall forms with the swell 22 and which was not right angled when the rear wall of the shuttle-box was swung inwards, again becomes a right-angled parallelogram. If necessary the falling movement of the shuttle can be initially accelerated by a spring acting on the shuttle from above, but not shown in the drawing, so as to ensure the shuttle being ejected from the shuttle-box into the receiver (not shown). If a shuttle is inserted incompletely, so that the front wall of the shuttle-box cannot close, the locking member connected to it can also not return into the position for locking the rear wall in its normal closed position. Owing to the return of the swell into its receiving position the finger 28 for the stopping lever will move into position ready to coact with the stopping lever, so that in this case as well the loom will be stopped with certainty.

In order to prevent the picker 40 from interfering with the new shuttle being introduced into the shuttle-box 2, the following means are provided: The picker 40 is connected by a tension member 42 to one arm 41 of a cranked lever 41, 41' which is pivoted on a pin 43 fixed on a cross piece 63 of the loom frame. A tension spring 44, one end of which is also attached to the cross piece 63, is connected to the arm 41' of the cranked lever. The check strap 45 of the picker 40 is normally under the action of a spring 46 which acts on the picker 40 in opposition to the spring 44. During the shuttle changing operation the check strap 45 is withdrawn from the action of the spring 46 by means of a wedge 47 connected to the front wall 11 of the shuttle-box. The wedge 47 coacts with a lever 15 pivoted on a vertical pivot pin 52 and urged towards the wedge by means of a helical torsion spring 51. The free end of the lever 15 is attached to one end of a strap 48 the other end of which is attached to the check strap 45. When the front wall 11 is raised the wedge 47 rocks the lever 15 outwardly against the force of the spring 51, thereby tensioning the strap 48 and relieving the check strap of the load of the spring 46. The spring 44 will now move the picker 40 outwardly through the intermediary of the lever 41, 41' and tension member 42 out of the way of the incoming shuttle. When the front wall of the shuttle box returns to its closed position the wedge 47 allows the lever 15, to return to its normal position under the action of the spring 51, thereby allowing the check strap to be again acted on by the spring 46 and to move the picker into contact with the new shuttle which has been introduced into the shuttle-box, so that the blow delivered by the picker will not lose any of its force. The lever 49, which coacts with the lateral locking projection of the cam 50 on the driving lever 16, prevents the shaft 25 from being turned back by its spring 26, when the front wall of the shuttle-box is opened during the shuttle changing operation.

I claim:

1. Shuttle-changing mechanism for looms, comprising in combination with mechanism for initiating the shuttle-changing operation on the weft failing, a shuttle-box having a rear wall capable of swinging inwards for ejecting the spent shuttle and a front wall intended to be raised for allowing a full shuttle to enter the shuttle-box, a spring for moving said rear wall inwards, a spring for maintaining said front wall in its closed position, means including a driving lever connected to the front wall of the shuttle-box, for raising said front wall during the rearward movement of the slay immediately before the change of shuttles takes place, a locking member intended to engage said driving lever for preventing said rear wall from swinging inwards until said front wall is completely raised and for maintaining said front wall in its raised position while the rear wall is swung inwards and a stationary stop member provided on the loom frame for swinging the rear wall outwardly again at the end of the beat after the shuttle has been changed.

2. In a shuttle changing mechanism as claimed in claim 1, a resilient checking tongue pivoted at one end to the rear wall of the shuttle-box so as to be capable of swinging laterally of said rear wall and having its free end prolonged beyond the axis about which said rear wall swings, said checking tongue being intended to be displaced by the spent shuttle as the latter leaves the shuttle-box and to hold said shuttle against the rear wall, a pusher for introducing a fresh shuttle into the shuttle-box, a pusher finger, means for connecting the free end of the checking tongue to the pusher finger for moving said finger into a position ready to engage the pusher and actuate it during a forward movement of the slay, said pusher finger being also capable of imparting an additional displacement to the checking tongue during the forward movement of the slay for releasing the spent shuttle, whereby the pusher finger is only capable of engaging and actuating the pusher after the spent shuttle has left the shuttle-box and passed between the rear wall and the checking tongue while the spent shuttle is released during the introduction of the fresh shuttle and is ready to fall out when the rear wall is swung back into its normal closed position at the end of the shuttle changing operation.

3. In a shuttle changing mechanism as claimed in claim 1, a resilient checking tongue pivoted at one end to the rear wall of the shuttle-box so as to be capable of swinging laterally of said rear wall and having its free end prolonged beyond the axis about which said rear wall swings, said checking tongue being intended to be displaced by the spent shuttle as the latter leaves the shuttle-box and to hold said shuttle against the rear wall, a pusher for introducing a fresh shuttle into the shuttle-box, a pusher finger, means for connecting the free end of the checking tongue to the pusher finger for moving said finger into a position ready to engage the pusher and actuate it during a forward movement of the slay, said pusher finger being also capable of imparting an additional displacement to the checking tongue during the forward movement of the slay for releasing the spent shuttle, a stopping lever, a member connected to the pusher finger so as to move in unison therewith, said member being capable of engaging said stopping lever when the rear wall of the shuttle-box is swung inwards and the pusher finger is not in position ready to engage the pusher but being incapable of engaging the stopping lever when the rear wall is in its normal closed position or when the pusher finger is in position ready to engage the pusher, as and for the purposes set forth.

4. Shuttle-changing mechanism for looms, comprising in combination with mechanism for initiating the shuttle-changing operation on the weft failing, a shuttle-box having a rear wall capable of swinging inwards for ejecting the spent shuttle and a front wall intended to be raised for allowing a full shuttle to enter the shuttle-box, a spring for moving said rear wall inwards, a spring for maintaining said front wall in its closed position, means including a driving lever connected to the front wall of the shuttle-box, for raising said front wall during the rearward movement of the slay immediately before the change of shuttles takes place, a shaft journalled on the slay, said shaft being connected to the spring for moving the rear wall inwards so as to be controlled by said spring, a locking pin provided on the driving lever, a locking member provided on said shaft, said locking member comprising an arcuate portion having a centre of curvature concentric to the axis of rotation of the driving lever, along which portion the locking pin on the driving lever is intended to slide for preventing the rear wall of the shuttle-box from swinging inwards until the front wall is completely raised, and a second arcuate portion having a centre of curvature situated on the axis of the shaft and forming a continuation of said arcuate portion, said second arcuate portion being intended to move behind the locking pin on the driving lever when the front wall of the shuttle-box is raised for allowing the rear wall to swing inwards and for maintaining the front wall in its raised position, and a stationary stop member provided on the loom frame for swinging the rear wall outwardly again at the end of the beat after the shuttle has been changed.

5. A shuttle-changing mechanism as claimed in claim 1, having a pusher for introducing a fresh shuttle into the shuttle-box, a pusher finger for actuating said pusher, means for stopping the loom and means actuable by the spent shuttle for moving said pusher finger into a position ready to engage said pusher and for moving said stopping means into an inoperative position, as and for the purposes set forth.

6. A shuttle-changing mechanism as claimed in claim 1, having a pusher for introducing a fresh shuttle into the shuttle-box, a pusher finger for actuating said pusher, a return spring for said pusher finger, a locking arm connected to the pusher finger so as to move in unison therewith, and a locking stop provided on the driving lever, said locking arm being capable of co-acting with the locking stop for preventing the pusher finger from being acted on by said return spring.

7. Shuttle-changing mechanism for looms, comprising in combination with mechanism for initiating the shuttle-changing operation on the weft failing, a shuttle-box having a rear wall capable of swinging inwards for ejecting the spent shuttle and a front wall intended to be raised for allowing a full shuttle to enter the shuttle-box, a spring for moving said rear wall inwards, a spring for maintaining said front wall in its closed position, means including a driving lever connected to the front wall of the shuttle-box, for raising said front wall during the rearward movement of the slay immediately before the change of shuttles takes place, a locking member intended to engage said driving lever for preventing said rear wall from swinging inwards until said front wall is completely raised and for maintaining said front wall in its raised position while the rear wall is swung inwards, a picker, a check strap for said picker, means, including a wedge provided on the front wall of the shuttle-box, for relieving the check strap from the action of the check strap spring, means, including a tension spring, for moving the picker out of the way of the fresh shuttle entering the shuttle-box when the front wall of the shuttle-box is raised and a stationary stop member provided on the loom for swinging the rear wall outwardly again at the end of the beat after the shuttle has been changed.

8. A shuttle-changing mechanism as claimed in claim 1, having a hook pivoted on the loom frame, said hook being capable of engaging with the driving lever for actuating it, means including a latch for maintaining said hook out of engagement with the driving lever, a stop member provided on the loom frame for retaining said latch, a weft feeler for releasing said latch from said stop member on the weft failing and means for raising the hook and re-engaging the latch with the stop member after the shuttle-changing operation has been completed.

9. A shuttle-changing mechanism as claimed in claim 1, having a hook pivoted on the loom frame, said hook being capable of engaging with the driving lever for actuating it, a lever rigidly connected to said hook, a latch provided on said lever for maintaining the hook out of engagement with the driving lever, a stop member provided on the loom frame for retaining said latch, a weft feeler for releasing said latch from said stop member on the weft failing, a spring for forcing the hook downwardly to engage the driving lever and means for raising the hook and re-engaging the latch with the stop member after the shuttle-changing operation has been completed.

10. A shuttle-changing mechanism as claimed in claim 1, having a hook pivoted on the loom frame, said hook being capable of engaging with the driving lever for actuating it, means including a latch for maintaining said hook out of engagement with the driving lever, a stop member provided on the loom frame for retaining said latch, a weft feeler for releasing said latch from said stop member on the weft failing, a curve provided on the hook, a pin provided on the driving lever, said pin being intended to coact with said curve for raising the hook at the end of the shuttle-changng operation and means for re-engaging the latch with the stop member after the hook has been raised.

11. Shuttle-changing mechanism for looms, comprising in combination with mechanism for initating the shuttle-changing operation on the weft failing, a shuttle-box having a rear wall capable of swinging inwards for ejecting the spent shuttle and a front wall intended to be raised for allowing a full shuttle to enter the shuttle-box, means for moving said rear wall inwards, means for maintaining said front wall in its closed position, means including a driving lever connected to the front wall of the shuttle-box, for raising said front wall during the rearward movement of the slay immediately before the change of shuttles takes place, a locking member intended to engage said driving lever for preventing said rear wall from swinging inwards until said front wall is completely raised and for maintaining said front wall in its raised position while the rear wall is swung inwards, and a stop member for swinging the rear wall outwardly again at the end of the beat after the shuttle has been changed.

In testimony whereof, I affix my signature.

MAX AUERBACH.